Patented May 4, 1954

2,677,692

UNITED STATES PATENT OFFICE 2,677,692

IMIDAZOLE COMPOUNDS

Otto Schnider, Basel, Switzerland, assignor to Hoffmann-La Roche Inc., Nutley, N. J., a corporation of New Jersey No Drawing. Application September 13, 1952, Serial No. 309,560

Claims priority, application Switzerland September 19, 1951

2 Claims. (Cl. 260—309)

The present invention provides novel imidazole compounds, more particularly 4-(β-amino-γ-bromopropyl)-imidazole and the acid addition salts thereof, preferably the hydrohalides. The invention comprises both the racemic and the optically active forms. The said novel imidazole compounds have a protracted depressing action on blood pressure and may accordingly be used as therapeutics.

The above mentioned novel imidazole compounds may be obtained by reacting β-amino-γ-imidazolyl-(4)-propanol or a salt thereof with hydrogen bromide, advantageously in the presence of water or acetic acid. The hydroxy group is thereby replaced by a bromine atom. The base formed may react with excess acid to produce the dihydrobromide, which is isolated. The stereoisomeric structure of the compound involved is not affected by the reaction. Thus, when starting from racemic β-amino-γ-imidazolyl-(4)-propanol, the end product obtained is a racemate. However, when the starting material is in the L-form, the end product obtained will also be the L-form. When the starting material is in the D-form, the end product will be the D-form.

Example 1

2 parts by weight of L-β-amino-γ-imidazolyl-(4)-propanol-dihydrochloride are heated for 6 hours at 100° C. with 50 parts by weight of aqueous hydrobromic acid (60%) in a sealed tube. The reaction product is diluted with water and treated with 1 part by weight of charcoal; the solution is filtered and concentrated to dryness in vacuo. The residue is dissolved in absolute alcohol and ether is added thereto until the solution starts to become cloudy. The mixture is left standing for 48 hours, the crystals are sucked off and washed with alcohol and ether. There are obtained 2.5 parts by weight of L-4-(β-amino-γ-bromopropyl)-imidazole-dihydrobromide which, after having been recrystallized in methanol and ether, forms colorless crystals. The novel compound is easily soluble in water and methanol, more difficultly soluble in ethanol and insoluble in ether. It melts at 210–212° C. with decomposition. $[\alpha]_D^{23°} = +16.8$ ($c=5$ in water).

Example 2

A mixture of 1 part by weight of D-β-amino-γ-imidazolyl-(4)-propanol-dihydrobromide and 25 parts by weight of a saturated solution of hydrogen bromide in acetic acid is heated for 4 hours at 105° C. in a sealed tube. Once the solution has cooled down, it is diluted with water and concentrated to dryness. The solid residue is dissolved in water, the solution is deodorized with charcoal and again concentrated to dryness. Finally, the product is dissolved in absolute methanol and crystallized by addition of ether. The D-4-(β-amino-γ-bromopropyl)-imidazole-dihydrobromide obtained is sucked off and washed with alcohol and ether. Yield: 1 part by weight. This salt melts at 210–212° C. with decomposition. $[\alpha]_D^{20°} = -17.5°$ ($c=1$ in water). When using racemic β-amino-γ-imidazolyl-(4)-propanol-dihydrobromide instead of the D-form mentioned above and otherwise operating exactly as above described, the reaction product obtained is racemic 4-(β-amino-γ-bromopropyl)-imidazole-dihydrobromide, which salt melts at 229–230° C. with decomposition.

I claim:

1. 4-(β-amino-γ-bromopropyl)-imidazole dihydrobromide.
2. 4-(β-amino-γ-bromopropyl)-imidazole.

References Cited in the file of this patent

FOREIGN PATENTS

| Number | Country | Date |
|---|---|---|
| 430,108 | Great Britain | June 13, 1935 |

OTHER REFERENCES

Chemical Abstract, vol. 44, p. 1100, citing Karrer-Helv Chim. Acta, 32, pp. 1936-8 (1949).